(12) United States Patent
Isaksson (10) Patent No.: US 9,776,668 B2
(45) Date of Patent: Oct. 3, 2017

(54) SIDE MEMBER, CHASSIS AND TRAILER CHASSIS PROVIDED WITH SUCH A SIDE MEMBER

(71) Applicant: SSAB TECHNOLOGY AB, Stockholm (SE)

(72) Inventor: Anders Isaksson, Falun (SE)

(73) Assignee: SSAB TECHNOLOGY AB, Stockholm (SE)

( * ) Notice: Subject to any disclaimer, the term of this patent is extended or adjusted under 35 U.S.C. 154(b) by 0 days.

(21) Appl. No.: 15/025,992

(22) PCT Filed: Oct. 3, 2014

(86) PCT No.: PCT/EP2014/071247
§ 371 (c)(1),
(2) Date: Mar. 30, 2016

(87) PCT Pub. No.: WO2015/049375
PCT Pub. Date: Apr. 9, 2015

(65) Prior Publication Data
US 2016/0229455 A1    Aug. 11, 2016

(30) Foreign Application Priority Data
Oct. 3, 2013  (SE) ..................... 1351167

(51) Int. Cl.
 *B62D 21/20* (2006.01)
 *B62D 21/02* (2006.01)
 *B62D 21/09* (2006.01)

(52) U.S. Cl.
 CPC ............ *B62D 21/20* (2013.01); *B62D 21/02* (2013.01); *B62D 21/09* (2013.01)

(58) Field of Classification Search
 CPC ......... B62D 21/20; B62D 21/02; B62D 21/09
 See application file for complete search history.

(56) References Cited

U.S. PATENT DOCUMENTS 1,696,039 A * 12/1928 Kane .................... E04C 3/08
                                                    52/693
3,940,162 A   2/1976 Winslow et al.
(Continued)

FOREIGN PATENT DOCUMENTS

DE          101 48 312      12/2002
DE       20 2004 020 470     7/2005
(Continued)

OTHER PUBLICATIONS

International Search Report for PCT/EP2014/071247 mailed Jan. 21, 2015, 4 pages.
(Continued)

*Primary Examiner* — Drew J Brown
(74) *Attorney, Agent, or Firm* — Nixon & Vanderhye P.C.

(57) ABSTRACT

Side member (23) for a chassis (27) provided with a wheel (26) which side member (23) comprises an upper flange (32) and a lower flange (33). Both of the flanges (32, 33) of the side member (23) have a continuous extension along the whole of the side member's (23) entire length. The upper or lower flange (32, 33) exhibits two oppositely directed curved portions (38, 39) that are both located in front of or behind said wheel (26) so that the curved flange's (32, 33) perpendicular distance to the non-curved flange (32) at one end of the chassis (27) is greater than the corresponding perpendicular distance to the non-curved flange (32) at the other end of the chassis (27). The non-curved flange (32) and the curved flange (33) are connected to one another via at least one connecting member (40, 51, 52). The side member (23) is provided with a center flange (34) which is located between said upper flange (32) and said lower flange (33) and which extends from one end of said upper and lower flange (32, 33) to a region located between said two curved portions (38, 39).

16 Claims, 6 Drawing Sheets

(56) References Cited

U.S. PATENT DOCUMENTS

| | | | |
|---|---|---|---|
| 4,049,285 A | | 9/1977 | Chieger |
| 4,576,398 A | * | 3/1986 | Kinne ................... B62D 63/08 |
| | | | 280/789 |
| 5,242,185 A | * | 9/1993 | Carr ..................... B62D 53/061 |
| | | | 280/423.1 |
| 5,351,990 A | * | 10/1994 | Thomas ............... B62D 53/061 |
| | | | 280/789 |
| 6,681,489 B1 | * | 1/2004 | Fleming ................. B62D 21/12 |
| | | | 280/785 |
| 7,717,498 B2 | * | 5/2010 | Fleming ................. B62D 21/02 |
| | | | 280/781 |
| 8,985,631 B2 | * | 3/2015 | Garceau ................ B62D 21/02 |
| | | | 280/781 |
| 2007/0241587 A1 | | 10/2007 | Fleming |
| 2009/0256399 A1 | | 10/2009 | Sherbeck et al. |

FOREIGN PATENT DOCUMENTS

| | | |
|---|---|---|
| GB | 1 308 560 | 2/1973 |
| GB | 1 314 422 | 4/1973 |
| GB | 2 034 792 | 6/1980 |
| JP | 2005-199840 | 7/2005 |
| WO | WO 90/04534 | 5/1990 |
| WO | WO 2011/111510 | 5/2011 |

OTHER PUBLICATIONS

International Preliminary Report on Patentability for PCT/EP2014/07124 mailed Dec. 17, 2015, 6 pages.

* cited by examiner

PRIOR ART

SIDE MEMBER, CHASSIS AND TRAILER CHASSIS PROVIDED WITH SUCH A SIDE MEMBER

This application is the U.S. national phase of International Application No. PCT/EP2014/071247 filed 3 Oct. 2014 which designated the U.S. and claims priority to SE Patent Application No. 1351167-0 filed 3 Oct. 2013, the entire contents of each of which are hereby incorporated by reference.

TECHNICAL FIELD

The present invention concerns a side member for a trailer chassis for a vehicle, a chassis and a trailer chassis with such a side member.

BACKGROUND

Many previously known side members for trailer chassis are made from spliced beam components whereby the joints constitute weakened regions in the side member which means that the beam has to be over-dimensioned. Many existing side members for trailer chassis are therefore relatively heavy in order to be able to carry a certain load.

British patent application no. GB 1 314 422 discloses a vehicle chassis comprising two longitudinally extending structural members each of which has two elongate plate-like flanges that extend in the longitudinal direction of the member and which are spaced apart and interconnected by a web corrugated in the longitudinal direction such that the line of interconnection of the web and each flange defines a wave.

U.S. Pat. No. 3,940,162 describes a load-bearing structural member comprising an upper plate member, a lower plate member spaced a distance X from the upper plate member, and a reinforcing web comprising a plurality of web segments extending back and forth between the web segments in zigzag fashion. The web segments meet the plate members at a web angle, θ wherein the magnitude of the two variables X and θ are varied over the length of the structural member in accordance with the weight, strength, and shape requirements of particular sections thereof.

German patent no. DE 10148312 concerns carrier frame that has a pair of relatively spaced longitudinal supports extending in the vehicle longitudinal direction, coupled via transverse supports. Each longitudinal support has upper and lower members joined by a number of vertical elements, whereby each lower member is divided into a front section, a central section and a rear section, with auxiliary transverse supports between the central sections of both longitudinal supports forming a plafform for an engine block, fitted to the carrier frame as a pre-assembled unit.

British patent application no. GB 2034792 discloses a structural element consisting of a pair of chords and a web in the form of a zigzag strip consisting of oblique straights alternating with crests by which the web is joined to, and between the chords. Each of the crests is a flat of parallelogrammatic form and has the larger of the supplementary angles of the parallelogram between 120° and 150°. Each of the straights has its major cross-sectional dimension extending in a plane parallel to that of the chords or at least having a component parallel to the plane of the chords.

International publication no. WO 2011/111510 describes a floor structure of a trailer that can reduce the number of assembly steps and lighten a vehicle body. The floor structure is provided with main beams that extend in the lengthwise direction of the trailer and a plurality of floor members extend in the lengthwise direction. A planar structure is formed by linking the main beams and the floor members in the widthwise direction of the trailer. The main beams and the floor members comprise long aluminum alloy members.

SUMMARY

The present invention aims to provide an improved side member for a chassis and especially a trailer chassis, which side member is relatively lightweight but which can carry the same loads and thereby achieve the same flexural rigidity as previously used side members and trailer chassis.

The above-mentioned aim is achieved by the present invention, as defined in the independent claims. Suitable embodiments of the invention are given in the dependent claims.

The aim is namely achieved by a side member for a chassis provided with at least one wheel, which side member comprises an upper flange and a lower flange. Both of the flanges of the side member have a continuous (longitudinal) extension along the whole of the side member's entire length, i.e. each flange constitutes a single non-spliced structural component. Either the upper flange or the lower flange exhibits two oppositely directed curved portions that are both located in front of, or behind said at least one wheel so that the curved flange's perpendicular distance to the non-curved flange at one end of the chassis is greater than the corresponding perpendicular distance to the non-curved flange at the other end of the chassis. The non-curved flange and the curved flange are connected to one another via at least one connecting member. The side member is provided with a centre flange which is located between the upper flange and the lower flange and which extends from one end of the upper and lower flange to a region located between the two curved portions.

The centre flange provides stiffness and strength in the lateral direction of the side member and may be arranged to extend in parallel to the upper and/or the lower flange. However, two or more of the three flanges of a side member according to the present invention do not need to be parallel.

In order to achieve a durable chassis, only screw-, rivet- and possibly adhesive joints are preferably used to connect the components constituting the side member. In order to minimize the weight, a connecting member such as a double lattice formed from struts may be used in an embodiment of the side member to carry vertical loads. The double lattice may be used since a centre flange is provided between a lower and an upper flange for the connection of axles and other components to the side member.

The lower flange, which is made of a bent or angled profile, bends upwards at a leading edge and meets the upper flange to provide space for pulling means, such as a vehicle. This upward bending is called "the gooseneck" and consists of two curved portions of the flange that are curved in opposite directions. In the curved region and where the distance between the upper and the lower flange is small, plates are preferably used. The plates, apart from providing simple connection parts have the advantage of helping to give the side member a more stable structure in the gooseneck region. In order to achieve a good transition from the centre flange to the part of the structure, a reinforcing plate, which can be made from a cast metal part, may be used in the gooseneck region. The rib-reinforcing plate increases the interface to other components, such as a landing gear for example. In order to provide extra strength and attachment possibilities, struts in a lattice may be replaced with attachment plates, also called rib plates, extra strength is needed, for example at the axel attachment points.

Specific details of the present invention are:
a curved lower flange of full length which is provided as a profile, i.e. it need not be made completely flat but can be angled like an L-profile for example.

in an embodiment of the invention the side member is provided as a lattice, in an embodiment of the invention a centre flange is arranged in the lattice, in an embodiment of the invention the side member is provided with a connection point in the form of a rib-reinforcing plate.

The invention concerns a side member for a chassis provided with at least one wheel, for example a trailer chassis, which side member comprises an upper flange with an extension along the whole of the chassis length. The side member is used for chassis in general and most particularly for trailer chassis. Even rail-bound, pulled or driven vehicles can use side members according to the invention. The side member further comprises a lower flange which also has an extension along the whole of the trailer chassis' length. The upper or the lower flange has two oppositely directed curved portions both located in front of or behind said wheel so that the curved flange's perpendicular distance to the other non-curved flange at one of the chassis' ends, for example the rear end, is greater than the corresponding perpendicular distance to the non-curved flange at the chassis' other end and that the non-curved flange and the curved flange are connected to one another via at least one rib. By providing both of the flanges in a single piece means that the risk of fractures at the joints of flanges are avoided.

By providing these flanges as profiles means that it is easy to connect different types of ribs, rib plates, attachment plates and lattice parts, such as angled struts, thereto, which can absorb extending and compressing loads. In the following, the expression "trailer chassis" is intended to mean a vehicle-towed chassis while the expression "chassis" is intended to mean both a vehicle-towed chassis and a self-driven vehicle chassis. The vehicle is intended to be used on a road, during construction work or on a railway. If the side member is used for a railway truck, the side member includes these oppositely directed curved portions both in connection with a first wheel suspension mounting and in connection with a second wheel suspension mounting.

In an embodiment of the invention the at least one connecting member is divided into a first upper connecting member located between said upper flange and said lower flange and a second lower connecting member located between said lower flange and said centre flange. The centre flange facilitates the attachment of axles and other components to the side member. The centre flange is also needed, as mentioned above, to give the side member stiffness and strength in the lateral direction.

According to an embodiment of the invention the at least one connecting member comprises at least one straight or curved rib, or flat, curved or corrugated plate or web plate, a uniform or non-uniform lattice, or any other suitable connecting component or structure. An advantage of using a plate or a web plate is that a thin plate can be used since the centre flange can be used to support and reinforce the web plate where components are bolted to the chassis frame, which saves weight and costs. Such a connecting member may comprise at least one weight-saving recess.

In an embodiment of the invention at least one of or at least some of all of said connecting members is/are provided as a number of struts provided as extendable or compressible elements connected to a respective flange at an angle $\alpha$ between the flange and the extendable or compressible elements in order to form a lattice, where $30°<\alpha<60°$. The extendable or compressible elements may be provided as struts with a circular cross section and with flat ends for attachment to the flange and optionally to the centre flange.

In an embodiment of the invention $\alpha=45°$.

In an embodiment at least one of said connecting members in the region of said two curved portions is constituted by at least one rib plate that is substantially flat. Since different loads affect said region mostly through the side member's tapered section and landing gear, it is advantageous to provide the connecting member in these regions with a rib plate in order to further increase the side member's strength.

In an embodiment the connecting member between said upper flange and said lower flange from the region of said two curved portions and to the side members' front end is provided as a substantially flat plate. This embodiment is advantageous because the distance between the flanges is less than at the side member' rear end. The distance at the front end can hereby only be a quarter of the distance at the rear end.

In an embodiment a reinforcing plate connects said upper flange and said lower flange in the region of said two curved portions. Such a reinforcing plate provides a strong connection of the flanges in the region and increases the structural strength especially considering that the landing gear supports the side member close to this region.

In order to further check the load transfer between the side member's different parts, in an embodiment the reinforcing plate is also connected to the rib between the flanges in front of the rib-reinforcing plate as well as to the connecting member(s) between the flanges behind the reinforcing plate.

As a centre flange is arranged in the side member, the reinforcing plate is also connected to said centre flange's front end. The aim of this is to reinforce the side member in that region.

In all of the embodiments, all of the connections and bonds of objects for forming the side member may be carried out using rivet- or screw joints.

The invention also concerns a trailer chassis comprising a plurality of side members, such as two or more parallel side members, which are connected to one another with at least one cross member and which side members are provided with one or more wheel suspension mountings on which at least one wheel is mounted. These side members are provided in accordance with the description above and the description in the detailed part of the specification.

According to an embodiment of the invention the at least one cross member is connected between the centre flanges of at least two side members. Such a construction imparts further strength and stability to the chassis since the upper and lower flanges of a chassis are usually subjected to the greatest stress. By providing at least one cross member between the centre flanges of at least two side members, the cross members will cooperate with the floor of the chassis to provide greater torsional rigidity.

According to an embodiment of the invention the at least one cross member is arranged to be clamped between at least two side members. For example, one or more connecting members, in the form of one or more plates, may be arranged to receive and clamp the ends of a connecting member, in the form of a bar or plate, extending between the side members or centre flanges of two or more side members.

According to an embodiment of the invention the chassis is provided as a vehicle-towed trailer chassis.

BRIEF DESCRIPTION OF THE DRAWINGS

The invention will now be described in more detail using non-limiting embodiments with reference to the accompanying drawings, of which

It should be noted that the drawings have not necessarily been drawn to scale and that the dimensions of certain features may have been exaggerated for the sake of clarity.

DESCRIPTION OF EXAMPLE EMBODIMENTS

Figure 1:
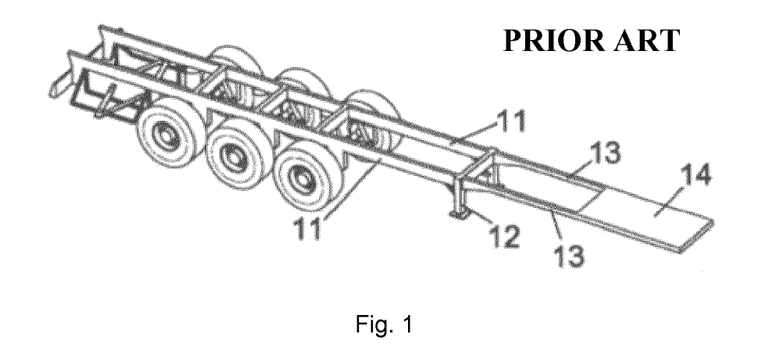
FIG. 1 shows a perspective view of a trailer according to the prior art.

FIG. 1 shows a trailer of conventional structure whose side members 11 are either homogeneous or provided as I-beams that are each constituted by a rib with two flanges. The disadvantage with these side members 11 is that they have a relatively high weight in relation to their stiffness. The side members 11 are also spliced in one or more places along their length although not usually in the region of the landing gear 12. From the landing gear 12, the side members 11 extend forwards as front beams 13 to a connection area 14 of the conventional type where connection to a towing vehicle takes place.

Figure 2:
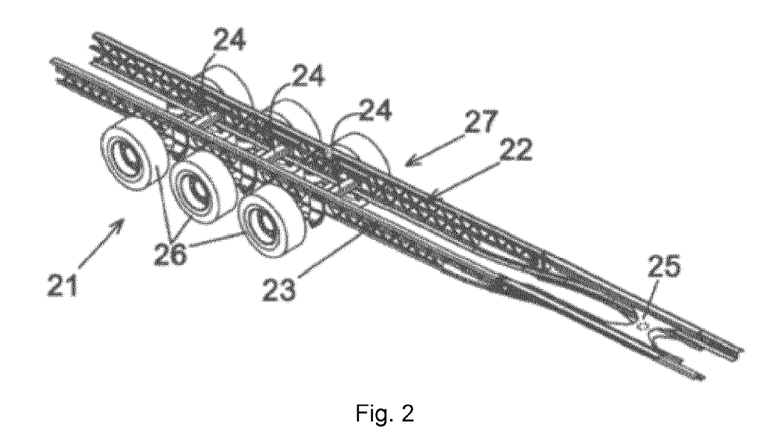
FIG. 2 shows in perspective a trailer according to the invention.

FIG. 2 shows a trailer 21 according to the present invention. The trailer comprises two side members 22, 23 which extend in parallel to one another and which are connected to each other via cross members 24. A connection means 25 for a towing vehicle is connected to the side members' front ends. These side members 22, 23 are continuous along the whole of their length, i.e. they are not spliced anywhere along their length. In the illustrated embodiment the trailer 21 is provided with three pairs of wheels 26 which are connected to the side members 22, 23, whereby the side members 22, 23 and the wheel pairs' suspension mountings define a trailer chassis 27. The side members 22, 23 according to the present invention may comprise metal, such as steel, plastic, a composite material, or any other suitable material or combination of materials.

Figure 3:
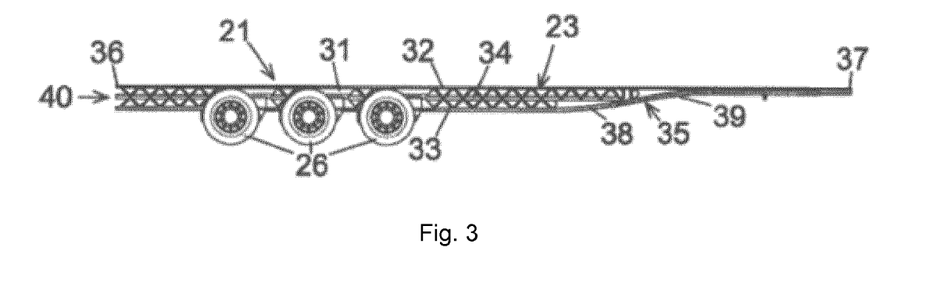
FIG. 3 shows a side view of a trailer according to the invention.

FIG. 3 shows a side view of the trailer 21 with the three wheel pairs 26 connected to a side member 23 which comprises an upper flange 32, a lower flange 33 and a centre flange 34. Each of these wheel pairs 26 is connected to both side members 22, 23 via wheel undercarriage plates 31 which are connected to the upper flange 32, to the lower flange 33, and to the centre flange 34 that is mounted between the upper flange 32 and the lower flange 33 and extends in parallel with flanges in the rear part of each side member 22, 23 up to the so called gooseneck 35. As can be seen from FIG. 3 all of the flanges are provided in one piece with an extension along the whole of the trailer chassis' length from its rear end 36 to its front end 37 without any joints. The lower flange 33 has two oppositely directed curved portions 38, 39 which form the gooseneck 35. Both curved portions are located in front of said wheel pairs 26 so that the lower flange's 33 perpendicular distance to the upper flange 32 at the trailer chassis rear end 36 is greater than the corresponding perpendicular distance to the upper flange 32 at the trailer chassis' front end 37. Furthermore, the upper flange 32 and the lower flange 33 are connected to one another via at least one rib 40 along the whole of the side member's 23 extension, i.e. from its rear end 36 to its front end 37.

Figure 4:
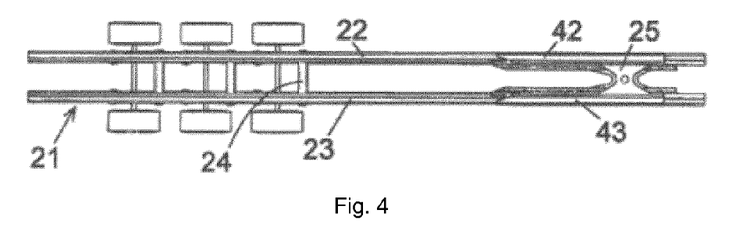
FIG. 4 shows a top view of a trailer according to the invention.

FIG. 4 shows the trailer 21 from above with the parallel side members 22, 23 connected with three cross members 24 and a connection means 25. The connection means is connected to the side members' front parts via beam-reinforcement elements 42, 43 which have an extension over and along a larger part of the narrow front part of each side member, i.e. the part from the gooseneck to the front end of each side member. It should be noted that the connecting members that interconnect the flanges 32, 33, 34 may extend outside of the vertical plane of the flanges 32, 33, 34 on the inside and/or outside of the trailer 21.

Figure 5:
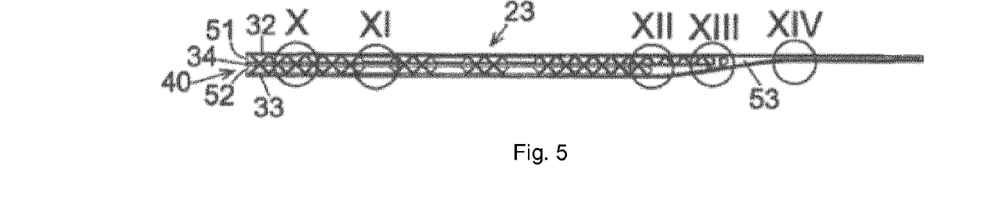
FIG. 5 shows a side member according to the invention.

FIG. 5 shows a side member 23 on which circled regions have been marked, which will be described in more detail in the following figures. FIG. 5 shows the rib 40 in the wide rear part of the side member 23 where the rib 40 comprises a first upper rib 51 located between said upper flange 32 and said centre flange 34 and a second lower rib 52 located between said lower flange 33 and said centre flange 34. Furthermore, FIG. 5 shows that the side member's 23 rib 40 in its narrow front part consists of a rib plate 53 that is substantially completely flat and which is riveted or screwed to both the upper and the lower flanges. It should be noted that a side member 22, 23 according to the present invention need not necessarily comprise the same connecting members 40, 51, 52 along the whole of its length. Furthermore, the flanges 32, 33, 34 of a side member 22, 23 need not all necessarily be of uniform thickness, or made of the same material or be uniformly spaced from one another along their length in the region outside the gooseneck 35.

Figure 6:
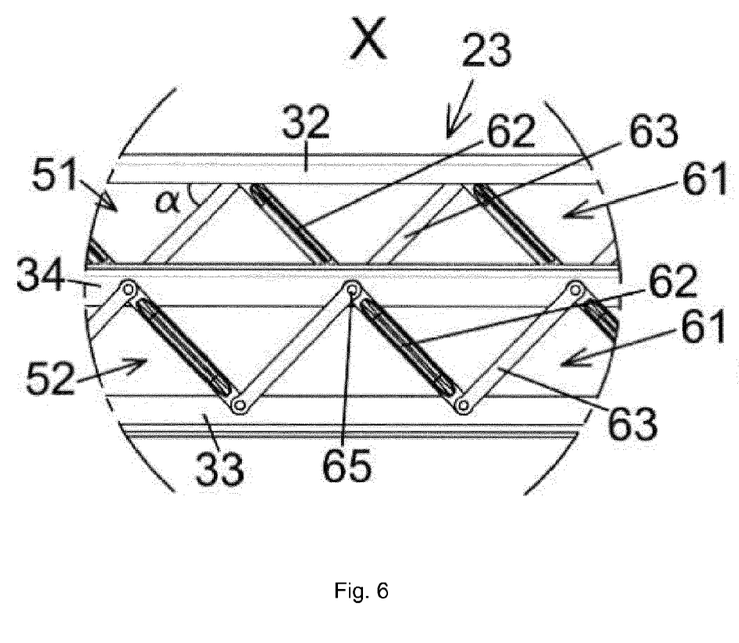
FIG. 6 shows an enlargement of the region X in FIG. 5.

FIG. 6 shows an enlargement of a section X of the side member 23 shown in FIG. 5. The section X shows the upper rib 51 and the lower rib 52. The upper rib 51 is provided as a number of extendable or compressible elements 61 in the form of struts which at one end are connected to the upper flange 32 and at their second end are connected to the centre flange 34. Each strut is provided as an extruded strut 62 or as a cast strut 63. The struts are connected to the upper flange and to the centre flange at an angle $\alpha=45°$ in order to form a lattice there-between. In a corresponding way, the lower rib 52 is provided as a number of similar struts 61 which are connected to the lower flange 33 at one end to the centre flange 34 at their other end. Each strut is also provided as an extruded strut 62 or a cast strut 63 in the lower rib. The struts are connected to the lower flange and to the centre flange at an angle $\alpha=45°$ to form a lattice there between. Each connection to the member and rib is in the form of a rivet- or screw-joint. The connections 65 to the centre flange 34 from the upper rib's 51 struts and from the lower rib's 52 struts are common which can be seen in FIG. 6.

Figure 7:
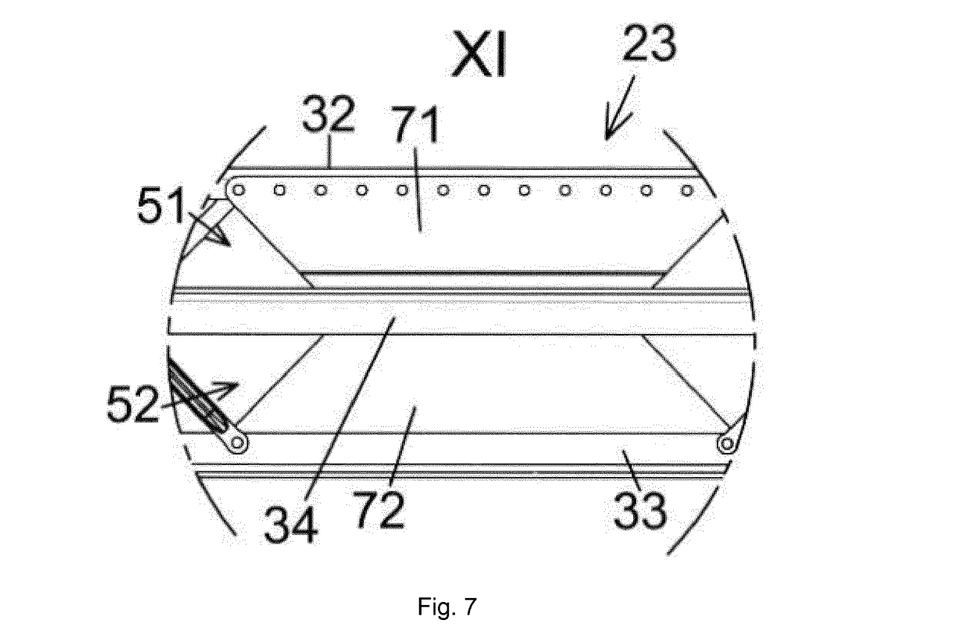
FIG. 7 shows an enlargement of the region XI in FIG. 5.

FIG. 7 shows an enlargement of a section XI of the side member 23 shown in FIG. 5. The distance between the upper flange 32 and the lower flange 33 is the same as in the section shown in FIG. 6 and even these flanges' respective distance to the centre flange 34 is the same. In the illustrated section XI the upper rib 51 is provided as an upper rib plate 71 and the lower rib 52 as a lower rib plate 72 alternatively as a combined rib plate. Both of these rib plates 71, 72 are riveted or screwed to the flanges 32, 33 and to the centre flange 34. The rib plates 71, 72 offer possibilities for attaching the trailer's wheel suspension mountings to the side members 22, 23.

Figure 8:
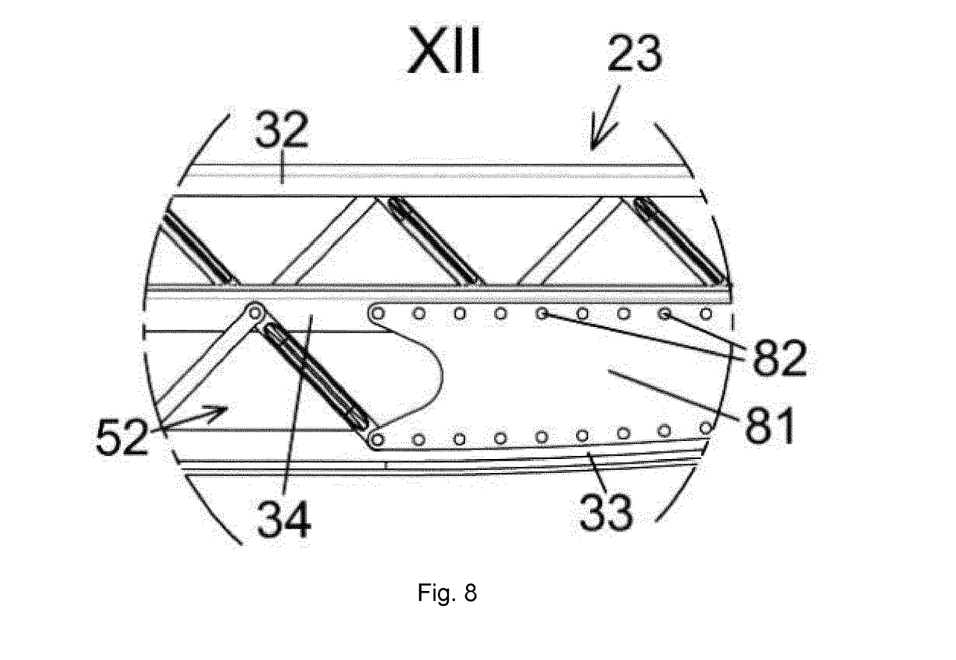
FIG. 8 shows an enlargement of the region XII in FIG. 5.

FIG. 8 shows an enlargement of a section XII of the side member 23 shown in FIG. 5. The distance between the upper flange 32 and the lower flange 33 starts to decrease in this section since the lower flange curves inwards towards the centre flange 34. In this curved region the lower rib 52 is constituted by a curved plate 81 to reinforce the lower rib in this section. In a corresponding way as for previous rib plates this curved plate 81 is also connected to the lower rib 33 and to the centre flange 34 with rivet- or screw joints 82 in order not to introduce stresses in the side member.

Figure 9:
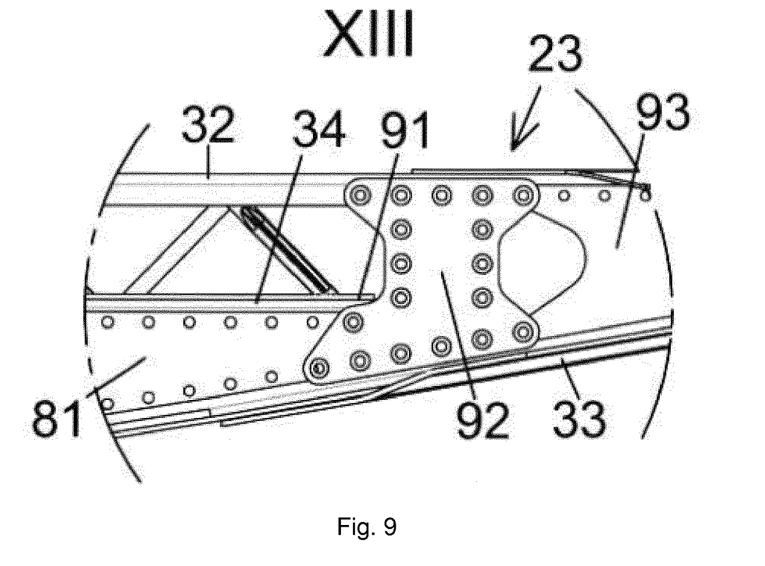
FIG. 9 shows an enlargement of the region XIII in FIG. 5.

FIG. 9 shows an enlargement of a section XIII of the side member 23 shown in FIG. 5. The distance between the upper flange 32 and the lower flange 33 decreases further successively in this section. The centre flange 34, which extends along the whole length of the side member 23 up to this section is located at a constant distance from the upper flange 32, and ends with a front end 91. The curved plate 81 is connected to a bridging rib 92 which constitutes a force-distributing element between the upper flange 32 and the lower flange 33 at the same time as it constitutes an end support for the centre flange's front end 91. Furthermore, the bridging rib 92 constitutes a force-distributing element for a front rib 93 which is connected between the upper flange 32 and the lower flange 33. The curved plate 81, the bridging rib 92 and the front rib 93 can all be referred to as rib plates.

Both of the FIGS. 8 and 9 show sections of the side member 23 in an area for a landing gear whereby the curved plate 81, the bridging rib 92 and the front rib 93 contribute to the side member's 23 structural strength in this area.

Figure 10:
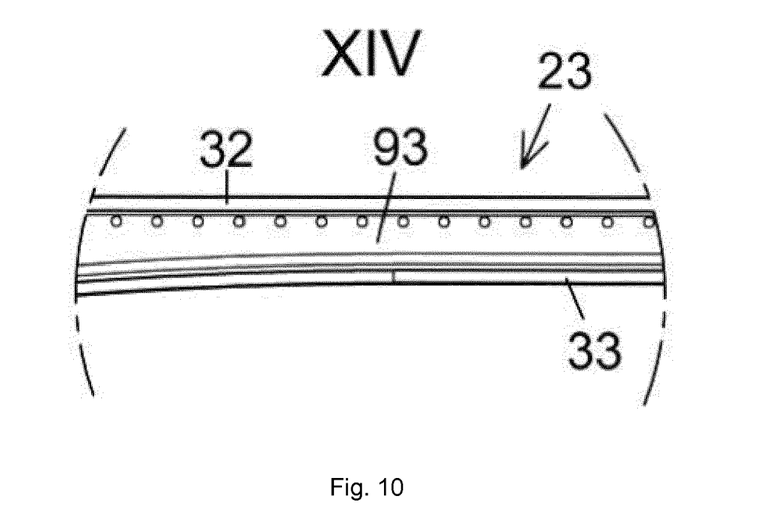
FIG. 10 shows an enlargement of the region XIV in FIG. 5.

FIG. 10 shows an enlargement of a section XIV of the side member 23 shown in FIG. 5. The distance between the upper flange 32 and the lower flange 33 decreases further successively in this section from this section and forwards along the side member is constant. The front rib 93 also constitutes a connection element for a connection means for a towing vehicle. As can be seen in the figure, the front rib 93 covers the whole gap between the upper flange 32 and the lower flange 33.

Figure 11:
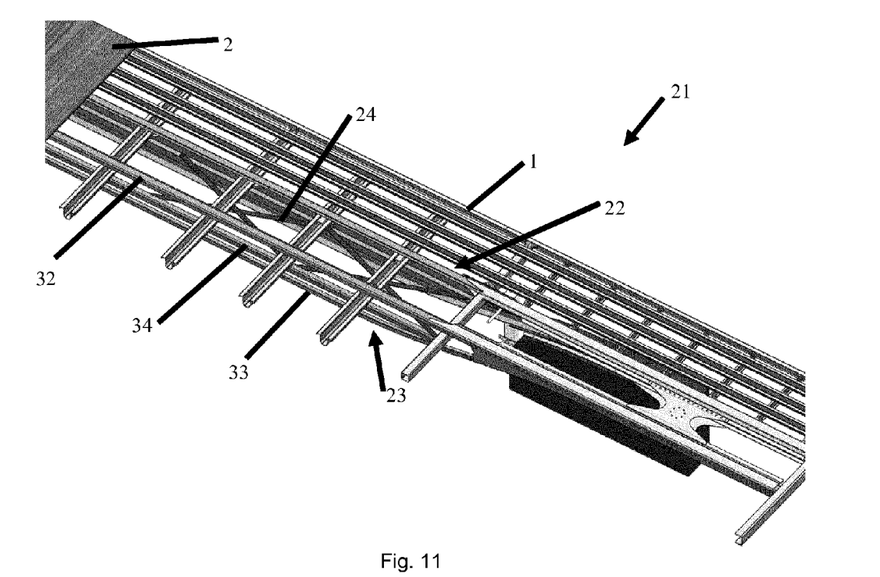
FIG. 11 shows cross members provided between the centre flanges of two adjacent side members.

FIG. 11 shows a perspective view of a trailer 21 comprising two side members 22, 23, each comprising a an upper flange 32, a lower flange 33 and a centre flange 34. Cross members 24 connect the centre flanges 34 of the two adjacent side members 22, 23. Alternatively or additionally, the cross members 24 may be connected between a plurality of upper flanges 32 or a plurality of lower flanges 33. Cross members 24 may also be connected between a certain flange of a first side member 22, such as the upper flange 32, and a different flange of a second side member 23, such as a lower flange 33.

In the illustrated embodiment, the cross members 24 take the form of a crossed lattice structure constructed from metal strips or bars of uniform thickness and cross section. The cross members 24 may however be of any shape, size or cross section and may form a uniform or non-uniform pattern along the length of the trailer 21.

It should be noted that FIG. 11 shows a trailer 21 comprising two side members 22, 23, and a plurality of cross beams which support a plurality of frame rails 1 that extend in the longitudinal direction of the trailer 21 and which are arranged to support the floor 2 of the trailer. A chassis or a trailer chassis according to the present invention may however comprise any number of side members 22, 23 which for example support frame rails 1 and a floor 2 of a trailer, and not only one side member 22, 23 on each outermost side of the chassis or trailer chassis.

Figure 12:
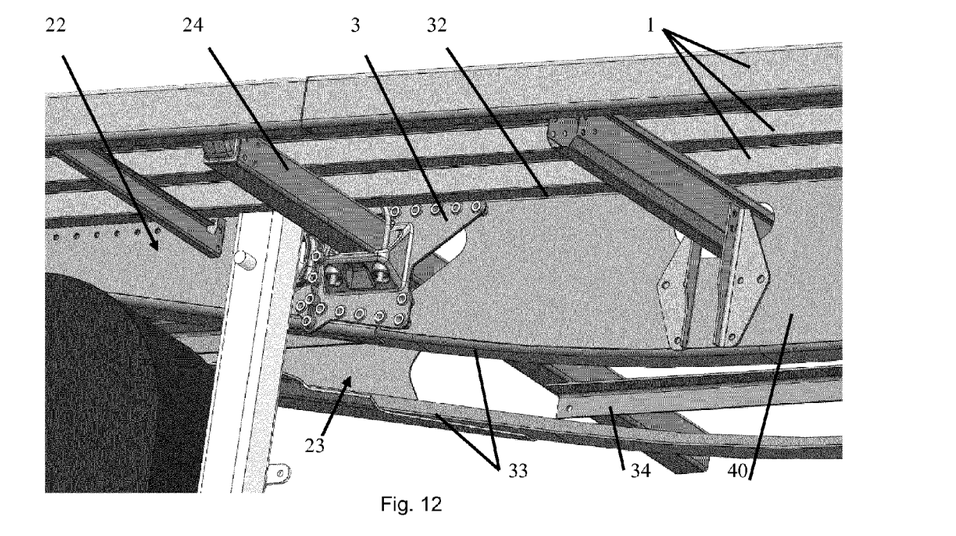
FIG. 12 shows cross members clamped between two side members.

FIG. 12 shows a chassis comprising two side members 22, 23 whereby each side member 22, 23 comprises connecting member, namely a plate 40, connected between its upper flange 32 and its lower flange 33. Cross members 24 extending in the lateral direction of the chassis are connected to the chassis by clamping their ends to a clamping fixture 3 connected to the plate 40 of each side member 22, 23, by means of rivet or screw joints for example. Such cross members 24 may however be connected to the chassis in any suitable manner.

Figure 13:
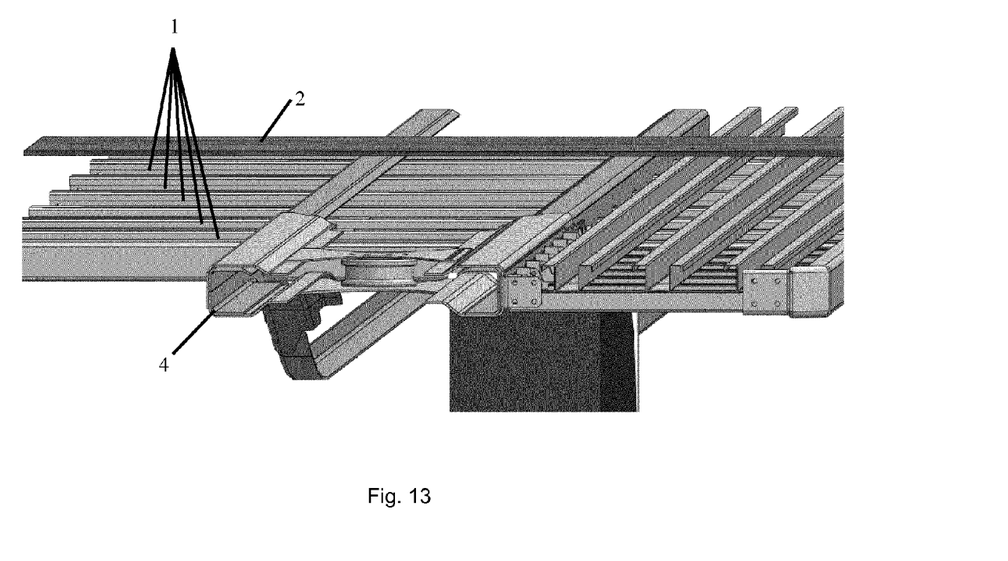
FIG. 13 shows part of a chassis according to an embodiment of the invention.

FIG. 13 shows a chassis according to the present invention comprising reinforcing bars 4 having a C-shaped profile which may be used to support the floor 2 of a chassis. Weld joints or countersunk screws do not need to be used to attach the reinforcing bars 4 to the frame rails 1 of the chassis since the heads of rivets or screws can be accommodated within the C-shaped profile.

The invention claimed is:

1. A side member for a chassis provided with a wheel, which side member comprises:
   an upper flange, and
   a lower flange,
   wherein both of the flanges of the side member have a continuous extension along the whole of the side member's entire length,
   wherein the upper flange or the lower flange exhibits two oppositely directed curved portions that are both located in front of or behind the wheel so that the curved flange's perpendicular distance to the non-curved flange at one end of the chassis is greater than the corresponding perpendicular distance to the non-curved flange at the other end of the chassis and that the non-curved flange and the curved flange are connected to one another via at least one connecting member, and
   wherein the side member is provided with a center flange which is located between the upper flange and the lower flange and which extends from one end of the upper and lower flange to a region located between the two curved portions.

2. The side member according to claim 1, wherein the at least one connecting member comprises at least one rib or plate or lattice.

3. The side member according to claim 1, wherein the connecting member is divided into a first upper connecting member located between the upper flange and the center flange and a second lower connecting member located between the lower flange and the center flange.

4. The side member according to claim 1, wherein the center flange extends in parallel with at least one of the upper or lower flange.

5. The side member according to claim 1, wherein the at least one connecting member is a rib and one, or at least some of all of the ribs is/are provided as a number of extendable or compressible elements connected to the respective flange at an angle α between the respective flange and the extendable or compressible elements to form a lattice, where $30° < \alpha < 60°$.

6. The side member according to claim 5, wherein the angle α is 45°.

7. The side member according to claim 1, wherein the at least one connecting member in the region of the two curved portions is constituted by at least one rib plate that is substantially flat.

8. The side member according to claim 1, wherein the at least one connecting member between the upper flange and the lower flange from the region of the two curved portions and to the members' front end is provided as a substantially flat plate.

9. The side member according to claim 1, wherein a bridging connecting member connects the upper flange and the lower flange together in the region of the two curved portions.

10. The side member according to claim 9, wherein the bridging connecting member is also connected to a rib plate that is located between the flanges and in front of the bridging connecting member as well as to the connecting member(s) located between the flanges and behind the bridging connecting member.

11. The side member according to claim 9, wherein the bridging connecting member is also connected to an end of the center flange.

12. The side member according to claim 1, wherein all of the connections and bonds of objects for forming the side member are carried out using rivet and/or screw joints.

13. A chassis comprising a plurality of side members which is connected to one another with at least one cross members and which plurality of side members is provided with one or more wheel suspension mountings on which at least one wheel is mounted, wherein the plurality of side members is provided according to claim 1.

14. The chassis according to claim 13 wherein the at least one cross member is connected between the center flanges of at least two side members.

15. The chassis according to claim 13 wherein the at least one cross member is arranged to be clamped between the at least two side members.

16. The chassis according to claim 13, wherein the chassis is provided as a vehicle-towed trailer chassis.

\* \* \* \* \*